US010102831B2

(12) United States Patent
Schulte

(10) Patent No.: US 10,102,831 B2
(45) Date of Patent: Oct. 16, 2018

(54) RETRACTABLE STRINGED INSTRUMENT

(71) Applicant: SCHULTE, INC., Tierra Verde, FL (US)

(72) Inventor: Peter G. Schulte, Tierra Verde, FL (US)

( * ) Notice: Subject to any disclaimer, the term of this patent is extended or adjusted under 35 U.S.C. 154(b) by 57 days.

(21) Appl. No.: 15/585,643

(22) Filed: May 3, 2017

(65) Prior Publication Data

US 2017/0287448 A1 Oct. 5, 2017

Related U.S. Application Data

(63) Continuation of application No. 15/004,453, filed on Jan. 22, 2016, now Pat. No. 9,715,867.

(51) Int. Cl.

| | |
|---|---|
| ***G01D 1/08*** | (2006.01) |
| ***G10D 1/08*** | (2006.01) |
| ***G10D 3/06*** | (2006.01) |
| ***G10D 3/14*** | (2006.01) |
| ***G10D 3/12*** | (2006.01) |

(52) U.S. Cl.

CPC ................. *G10D 1/08* (2013.01); *G10D 3/06* (2013.01); *G10D 3/12* (2013.01); *G10D 3/14* (2013.01)

(58) Field of Classification Search

CPC ............... G10D 3/06; G10D 3/12; G10D 3/14

See application file for complete search history.

(56) References Cited

U.S. PATENT DOCUMENTS

| | | | | |
|---|---|---|---|---|
| 4,095,503 A * | 6/1978 | Haagenson | ............. | G10D 1/00 84/173 |
| 5,196,641 A | 3/1993 | Schaller | | |
| 2015/0310838 A1* | 10/2015 | Borisoff | .................. | G10D 3/14 84/299 |

* cited by examiner

*Primary Examiner* — Kimberly Lockett

(74) *Attorney, Agent, or Firm* — David Kiewit

(57) ABSTRACT

The present invention includes a retractable stringed musical instrument; specifically a stringed musical instrument having a tailpiece, a body coupled to the tailpiece, a neck coupled to the body and a fingerboard coupled to the neck. The fingerboard and the neck extends and retracts relative to the body. The retractable stringed instrument further comprises a mechanism to maintain tension on the strings of the instrument regardless if the neck is in the extended or retracted position.

6 Claims, 21 Drawing Sheets

RETRACTABLE STRINGED INSTRUMENT

REFERENCE TO RELATED APPLICATION

This is a continuation application of U.S. patent application Ser. No. 15/004,453, filed Jan. 22, 2016, now issued as U.S. Pat. No. 9,715,867, which is hereby incorporated by reference.

FIELD OF THE INVENTION

The present invention relates generally to stringed instruments.

BACKGROUND OF THE INVENTION

FIG. 1 shows a prior art musical instrument 100. The musical instrument 100 shown in FIG. 1 is a six stringed electrical guitar. The musical instrument 100 shown in FIG. 1 includes a body 112, a neck 114 extending from the body 112 and a nut 116 extending transversely across the neck 114. A headstock 124 extends from the neck 114, and is shown in FIG. 1. The stringed musical instrument 100 also includes a bridge 118. A plurality of strings 120 is supported between the nut 116 and the bridge 118. FIG. 1 also shows a plurality of frets 122 extending perpendicular across the neck 114.

As shown in FIG. 1, conventional stringed musical instruments are typically equipped with a neck or fingerboard which is used to control the length, and therefore the vibrational frequency of the strings 120 being plucked, strummed, bowed, or otherwise activated.

In the conventional fretted stringed musical instrument, the string length is achieved through the fingers of the fretting hand pressing them against pieces of wire, the fret 122, imbedded in slots in the fingerboard. The string, being pressed against the hard surface of the fret 122 and thereby stopped, is effectively shortened by the amount of distance of the fret to the bridge 118, which defines the effective vibrating length of the string, thus altering its pitch (or 'frequency of vibration').

SUMMARY OF INVENTION

The invention includes a musical instrument having a body and a neck slidably mounted for movement longitudinally of the body between a first position and a second position. A head portion is disposed on the distal end of the neck. A depression in the neck extends along a least a portion of the neck and receives a trolley that moves therein between a first position and a second position.

The instrument also includes a tailpiece having a plurality of tuning machines affixed to the trailing end (bottom) of the body. The strings having a first end and a second end wherein the first end of each of the plurality of strings is attached to the trolley and the second end of each of the plurality of strings is attached to one of the plurality of tuning machines on the tailpiece.

BRIEF DESCRIPTION OF THE DRAWINGS

For a fuller understanding of the invention, reference should be made to the following detailed description, taken in connection with the accompanying drawings, in which.

DETAILED DESCRIPTION OF THE PREFERRED EMBODIMENT

The device will now be described with reference to the accompanying Figures. In all Figures, like numerals correspond to like elements. The device is directed to an apparatus and method for providing a hand-held stringed instrument that can vary in length between and extended and retracted state. Specific details of the device and its use are disclosed more completely below.

Figure 1:
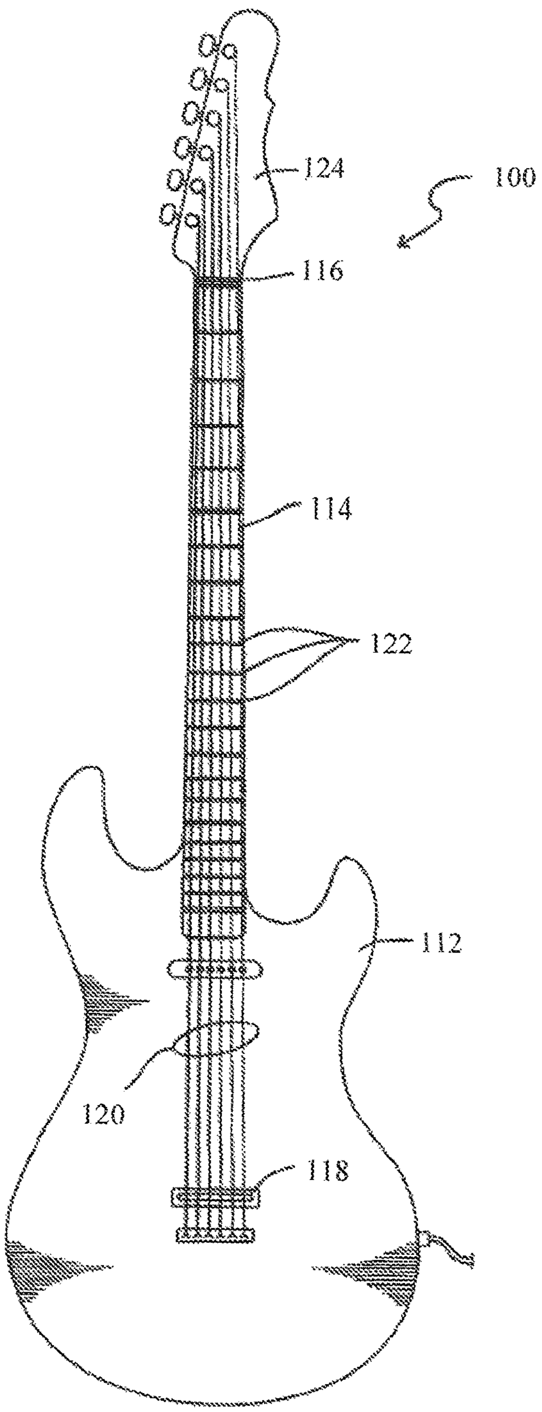
FIG. 1 (PRIOR ART)
FIG. 1 is a stringed instrument of the prior art.
Figure 2A:
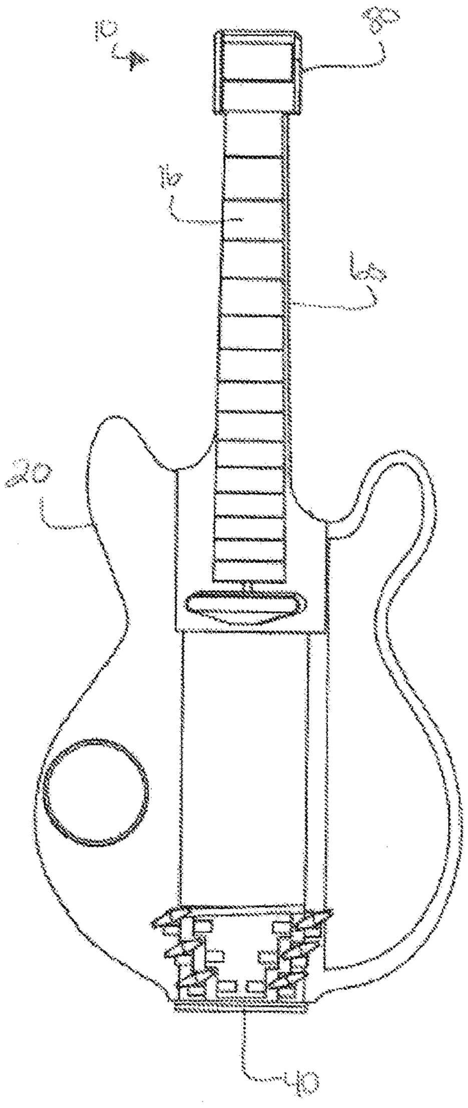
FIG. 2A is a front view of an illustrative embodiment of a stringed instrument having a slidable neck in an extended position.
Figure 2B:
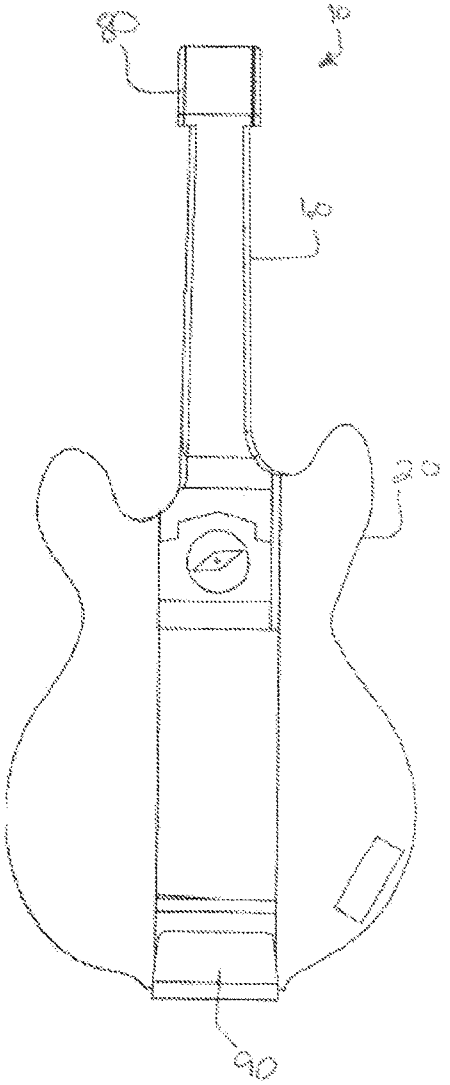
FIG. 2B is a back view of an illustrative embodiment of a stringed instrument having a slidable neck in an extended position.
Figure 3A:
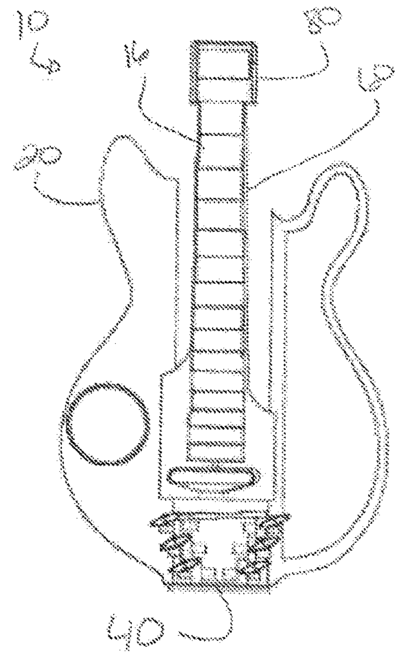
FIG. 3A is a front view of an illustrative embodiment of a stringed instrument having a slidable neck in retracted position.
Figure 3B:
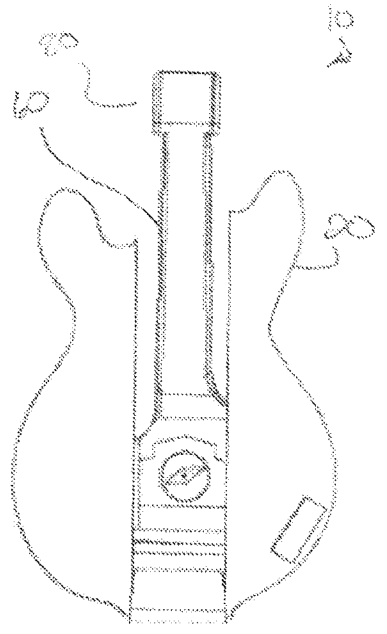
FIG. 3B is a back view of an illustrative embodiment of a stringed instrument having a slidable neck in retracted position.

By way of background, the term "stringed instrument" is intended to be directed to a wide variety of hand-held stringed instruments. Suitable, non-limiting examples include the acoustic guitar, electric guitar, acoustic bass guitar and electric bass guitar, banjo, mandolin, and similar type instruments. Although the Figures depict a six stringed electric guitar, the scope of this disclosure includes instruments with more or fewer strings Terms of location such as "upper" and "lower" are used merely for convenience. As are relative terms such as "proximal" and "distal." Unless otherwise specified the terms "upper," "lower," "above" and "below" are used in the context of the instrument as if it were standing upright, such as in FIGS. 2A and 2B. The terms "proximal" and "distal," generally, refer to parts of the inventive instrument in relation to an intended user as the device would be during ordinary use. "Leading" and "trailing" are used to describe a relation as though the device where moving in a path of travel along an axis from its lower to upper end. Notwithstanding the foregoing, all terms (including those of relative location) are to be construed in the context in which they are presented and are not restricted to the guiding principles set forth above.

Turning now to FIGS. 2A through 3B, a general embodiment of the inventive retractable stringed instrument is shown. In these figures, instrument 10 is depicted as an electric guitar. As with traditional guitars, instrument 10 includes body 20 with neck 60 attached to the upper end thereof. Neck 60 further includes head 80 at its distal end, relative to body 20. Instrument 10 further includes tailpiece 40 located on its lower end, relative to neck 60. In a preferred embodiment, tailpiece 40 is affixed to the surface of body 20. Other arrangements are, however, possible. For example, tailpiece 40 could be attached to the sidewall of body 20 at its lower end and thereby extend outward. As shown in FIG. 2B, instrument 10 also includes integrated stand 90 for use in extending neck 60 (as discussed below) or when the instrument is not in use.

Figure 4:
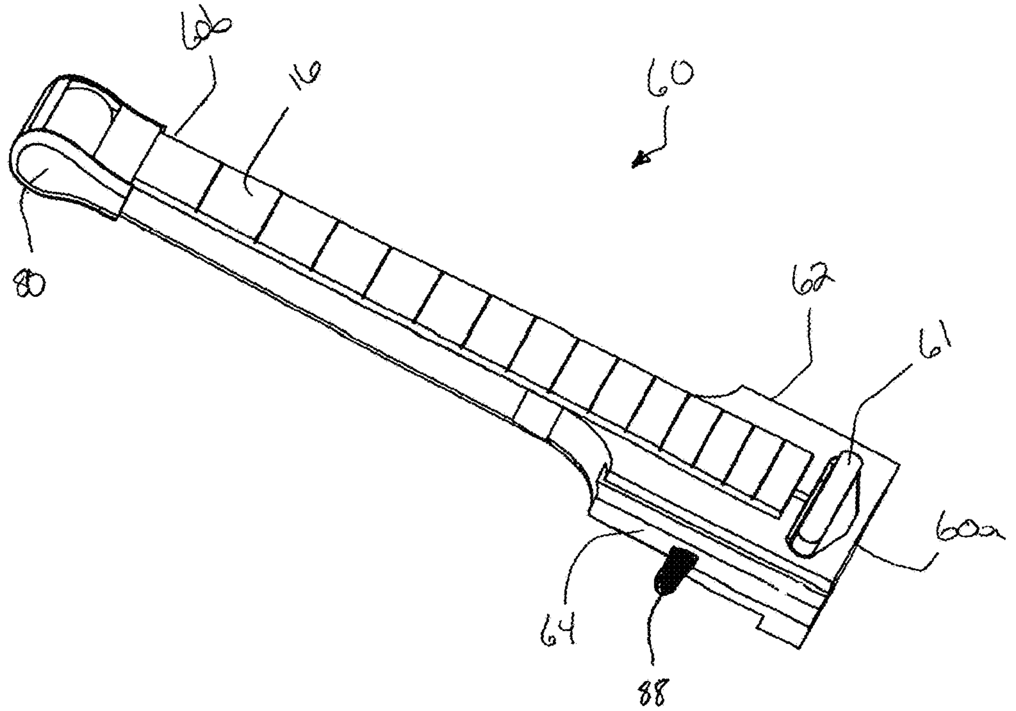
FIG. 4 is an orthogonal top view of a slidable neck according to an illustrative embodiment.
Figure 5:
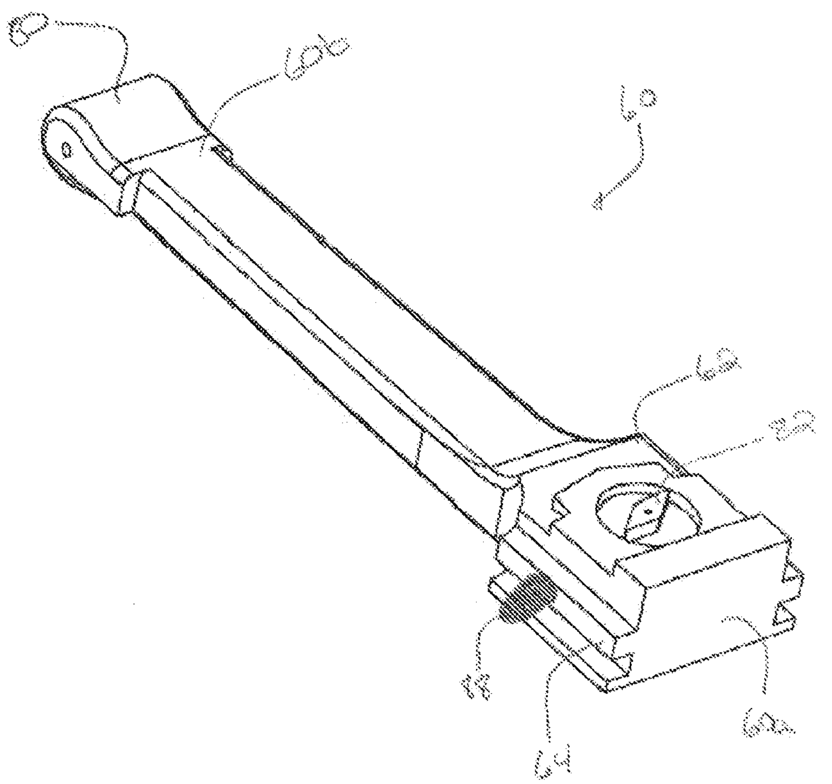
FIG. 5 is an orthogonal bottom view of a slidable neck according to an illustrative embodiment.
Figure 6:
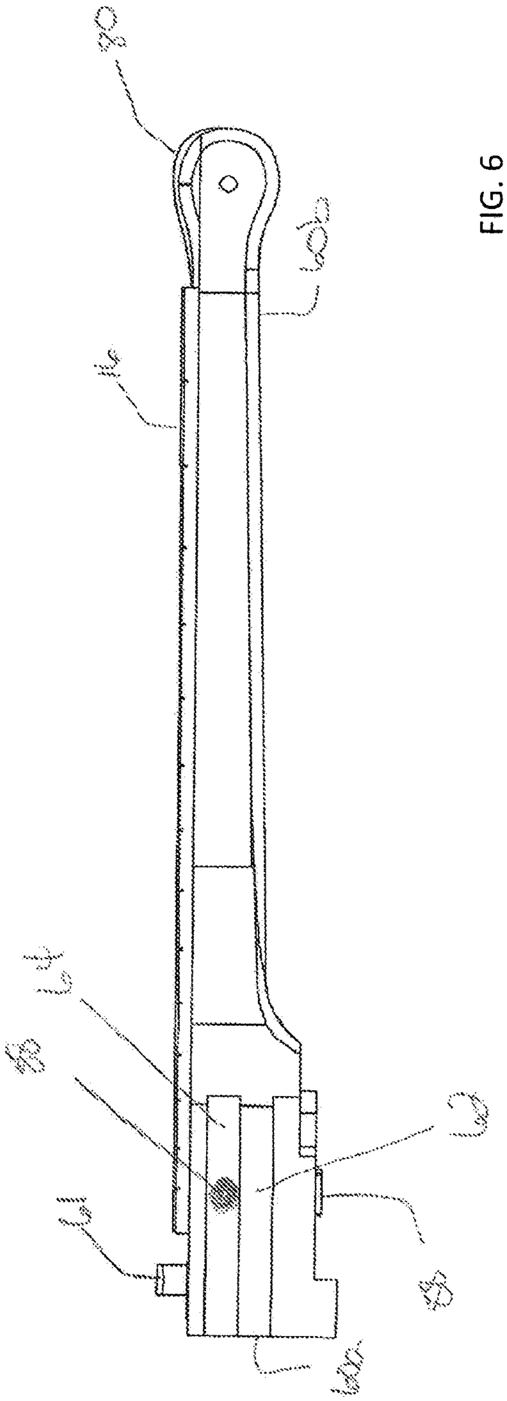
FIG. 6 is a side view of a slidable neck according to an illustrative embodiment.

As more closely seen in FIGS. 4 through 6, neck 60 includes a base section 62 positioned at the proximate end thereof and opposite head 80. As discussed in further detail below, it is base section 62 of neck 60 that engages with, and moves within, body 20.

Proximal end 60*a* of neck 60 with base section 62 thereof. A standard pickup 61 is affixed to the surface of base section 62 at the proximal end thereof. As shown, rails 64 extend outwardly from the sidewalls of base section 62. Rails 64 are received by, and slidably move within, channels 28 of body 20 (discussed below). Locking palls 88 extend outwardly from rails 64 to fix neck 60 in predetermined locations and are part of the locking mechanism (discussed below).

Neck 60 includes depression 63 which extends from a location adjacent head 80 to a location adjacent pickup 61. Depression 63 is preferably uniform in width along its length is substantially coincident with the longitudinal axis of neck 60.

Figure 7:
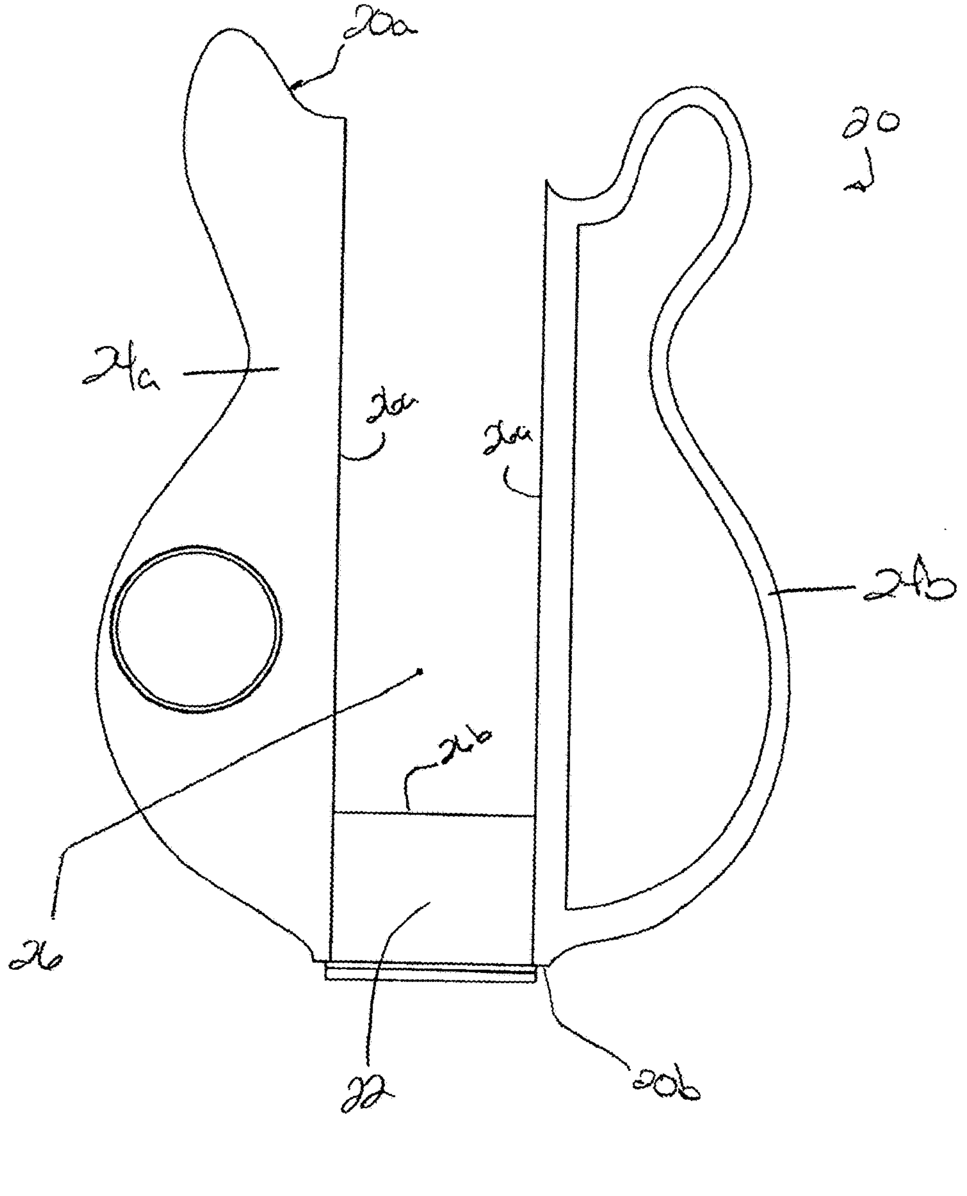
FIG. 7 is a front view of the body of an illustrative embodiment of a stringed instrument.
Figure 8:
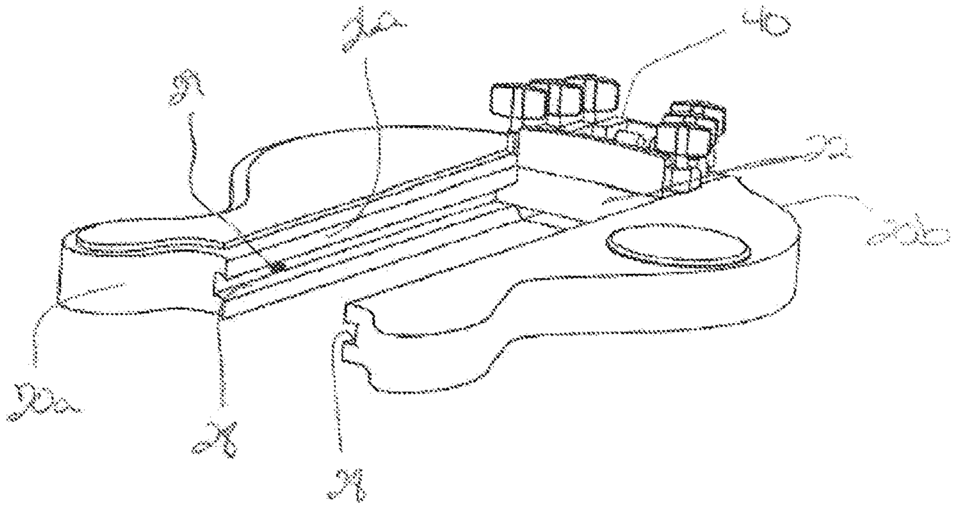
FIG. 8 is a perspective view of the body and tail piece of a stringed instrument according to an illustrative embodiment of the invention.

Body 20, shown in FIG. 7 with tailpiece 40 removed, has a leading end (20*a*) adjacent neck 60 and trailing end (20*b*). Tailpiece 40, in a preferred embodiment, is affixed to the upper surface of center block 22 as shown in FIG. 8. Body 20 further includes wing elements 24*a* and 24*b*. Each wing is connected to center block 22 at its lower end, at least, to form body 20. This arrangement forms interior space 26 which is defined by sidewalls 26*a* and lower wall 26*b*. Each side wall 26*a* includes a channel 28 extending at least partially between leading end 20*a* of body 20 and bottom wall 26*b*. Interior space 26 receives base section 62 of neck 60 and it is within interior space 26 that base section 62 travels as it moves between the extended and retracted positions. Channels 28 further include apertures 29 to receive palls 88 of the locking mechanism (discussed below) to selectively secure neck 60 in desired positions.

Figure 9:
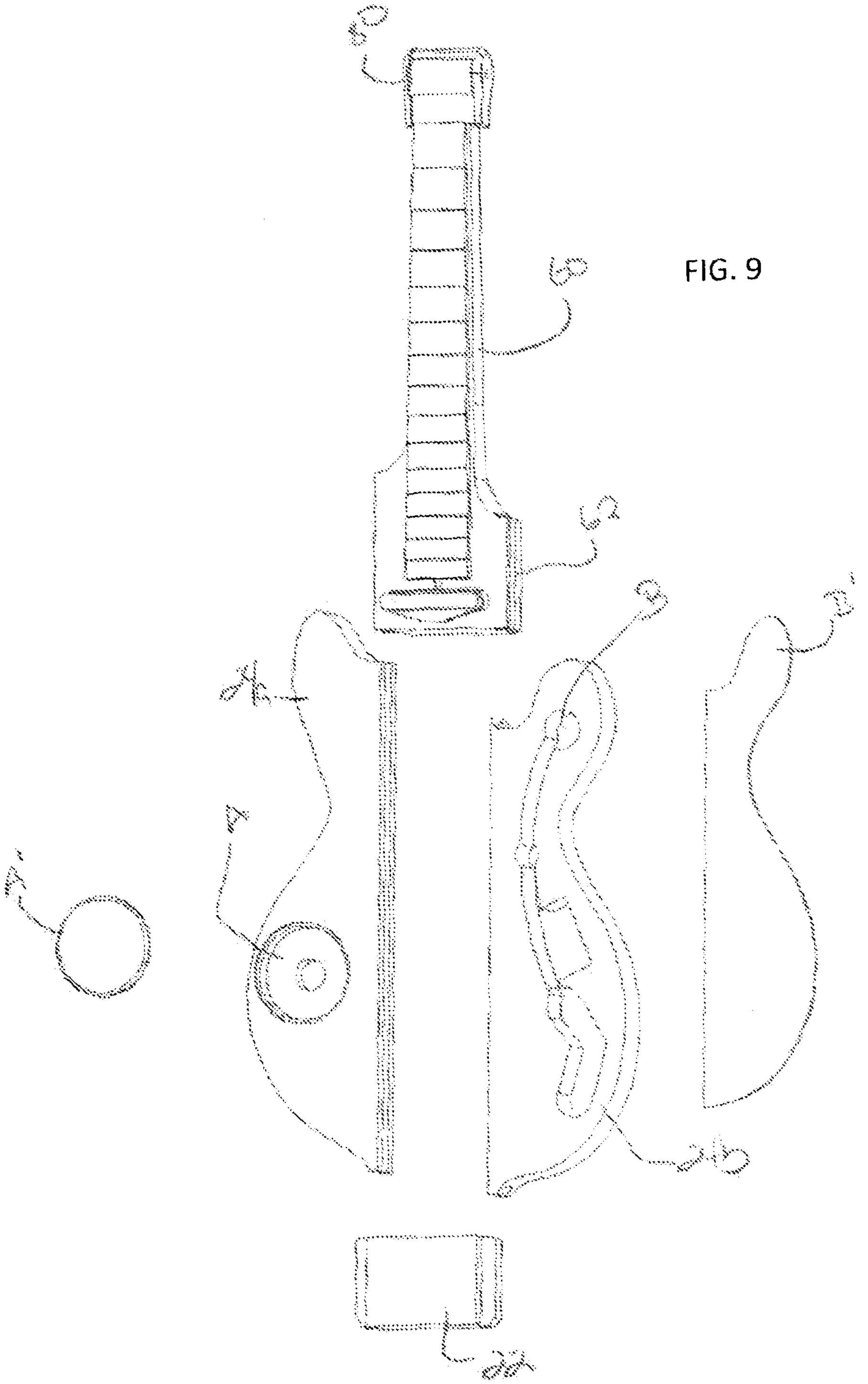
FIG. 9 is an exploded view of the body and neck of a stringed instrument according to an illustrative embodiment of the invention.

FIG. 9 is an exploded view of body 20 and neck 60. Also shown are recess A and B which receive electronics associated with the instrument. For example, recess A could house a speaker (not shown) that is covered by speaker cover $A^1$. Recess B can hold additional electronics common in the industry (not shown) that are in turn covered by pickguard $B^1$.

An important feature of the inventive instrument is the ability to maintain tension on the strings whether the neck of the instrument is in the extended or retracted position. This is accomplished by an intricate tensioning mechanism as discussed below.

Figure 10:
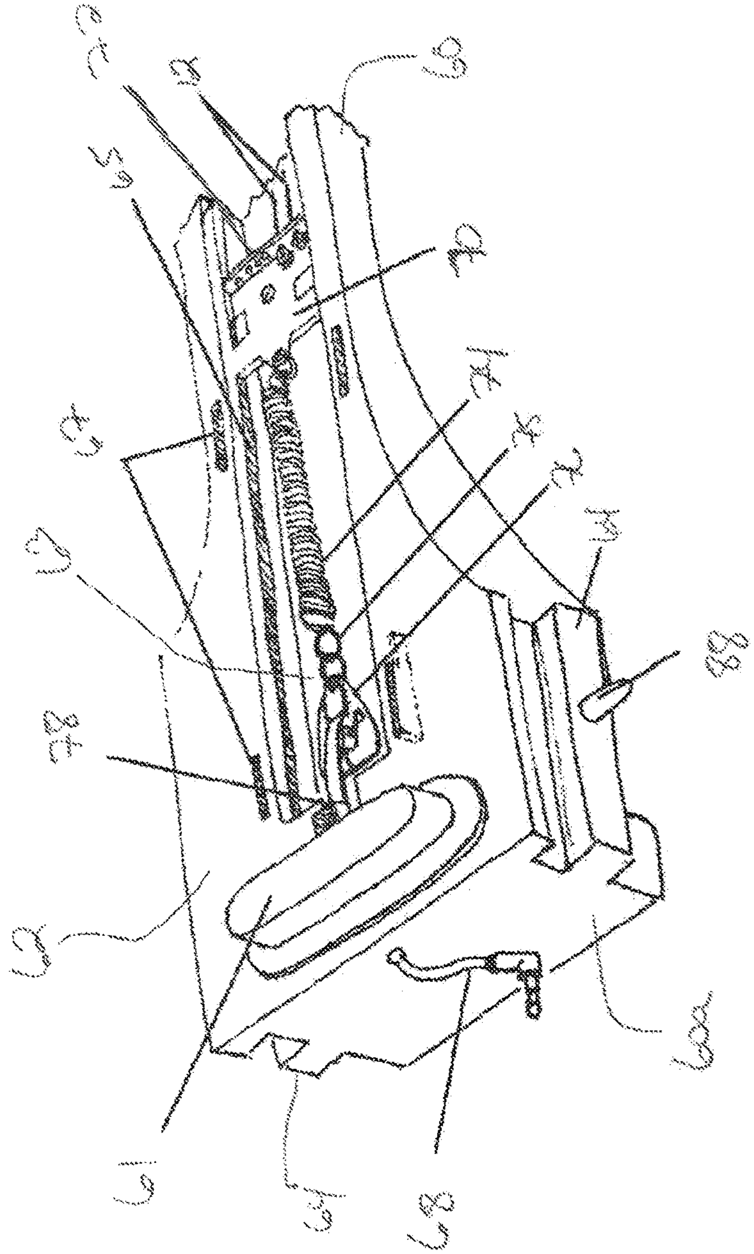
FIG. 10 shows a view of the proximal portion of the neck with the fret board removed.

Referring now to FIG. 10, a portion of neck 60 is shown with fret board 16 removed. Trolley 70 moves longitudinally within depression 63 and is substantially rigid. The distal ends of strings 12 are connected to trolley 72. In one embodiment, flange 72 extends upward from trolley 70 and received strings 12. In such an embodiment the overall height of trolley 70 and flange 72 do not exceed the depth of depression 63. Trolley 70 is secured within depression 63 by means of flanges extending therefrom which are received by groves 65 formed in the sidewalls of the depression.

A first end of spring 74 attached to trolley 70 opposite flange 72. Spring 74 provides the biasing force needed to maintain tension on strings 12 regardless of the relative position of neck 60. The second end of spring 74 is attached to an anchoring point 76 affixed within the proximal end of depression 63. As shown in FIG. 10, slip rings 75 can be used to adjust the tension of spring 74 as well as facilitate the attachment thereof to anchor 76. Slip rings 75 can also be used to attach spring 74 to trolley 70 (see also FIG. 11 below).

Figure 11:
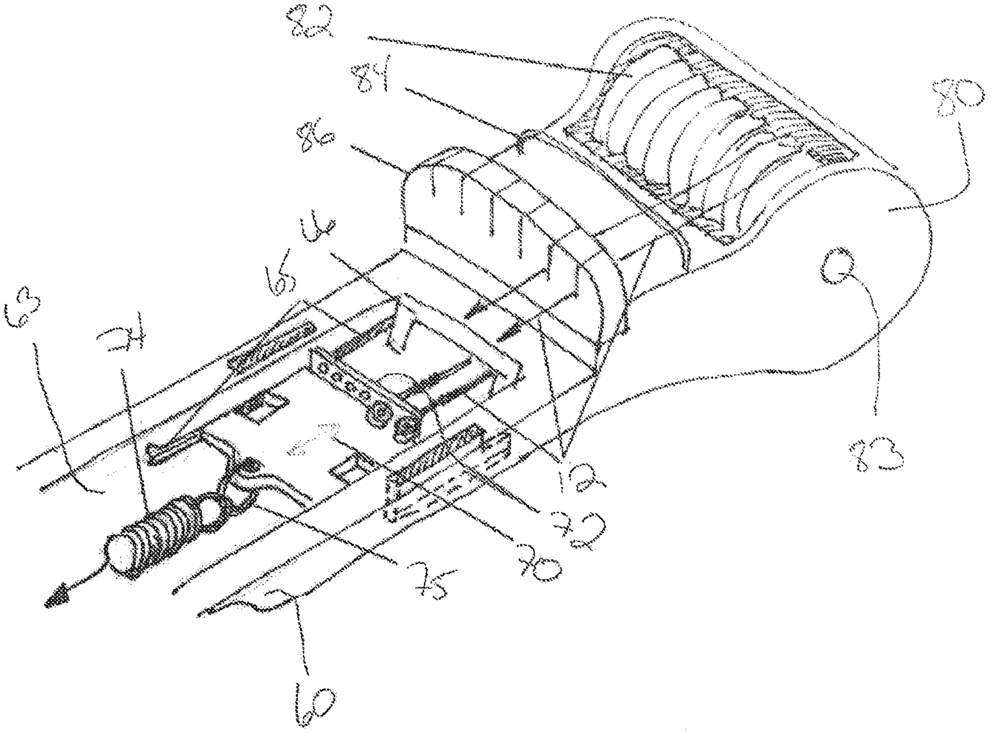
FIG. 11 shows a view of the distal portion of the neck with the fret board removed.

FIG. 11 shows trolley 70 within depression 63 of neck 60 at the distal end thereof (adjacent head 70). This indicates the instrument is in the extended position. A metal stop 66 adjacent the distal end of depression 63. As it can be seen, the distal ends of strings 12 are attached to trolley 70 via flange 72. The strings extend upward from flange 72 toward head 80 and around rollers 82 disposed therein. Rollers 82 can rotate on an axle (83) extending across head 80. Alternatively, strings can simply lie over a transverse member having a sufficient radius to allow the strings to move there over as neck 60 travels between an extended and retracted position (and vice versa).

Figure 12:
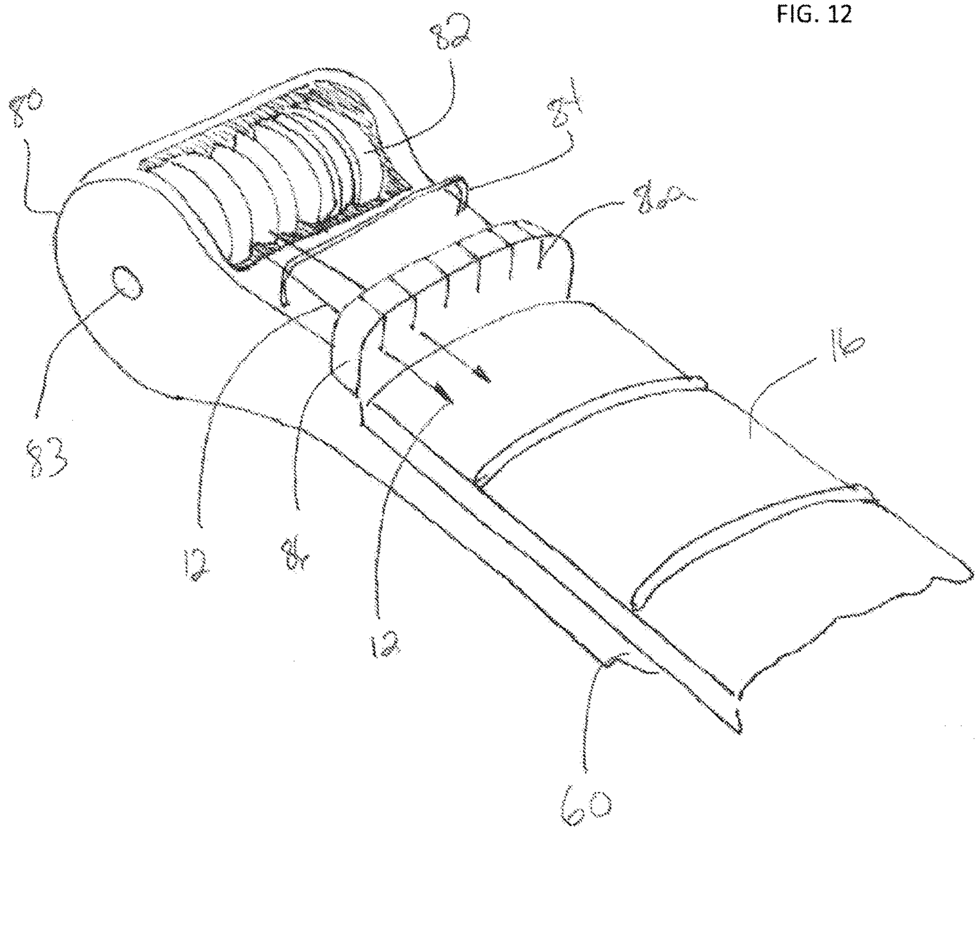
FIG. 12 shows a view of the distal portion of the neck with the fret board attached.

FIG. 12 shows the distal end 60*a* of neck 60 with fret board 16 attached thereto. Strings 12 on the upper side of rollers 82 extend downward toward trailing end 20(*b*) of body 20 passing under keeper 84. Nut 86 includes numerous slots 86*a* through which strings 12 pass to aid in maintaining string alignment.

As shown in FIG. 12, the tensioning mechanism of instrument 10 is hidden during use by removable fret board 16. Tines extending from fret board 16 are received by and engage receptacles 67 on neck 60 (see FIGS. 7 and 8). Fret board lock 78 (FIG. 7) holds fret board 16 in place when it is in position.

Figure 13A:
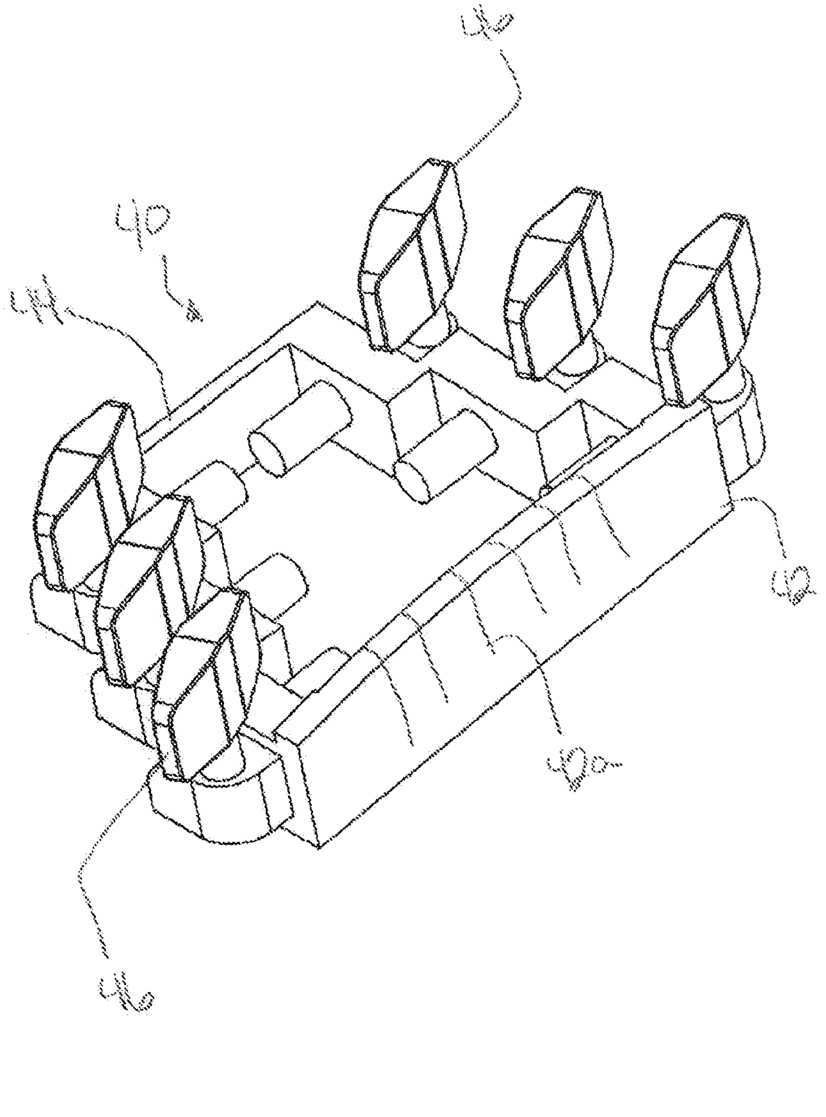
FIGS. 13A and 13B are detail views of the tailpiece.
Figure 13B:
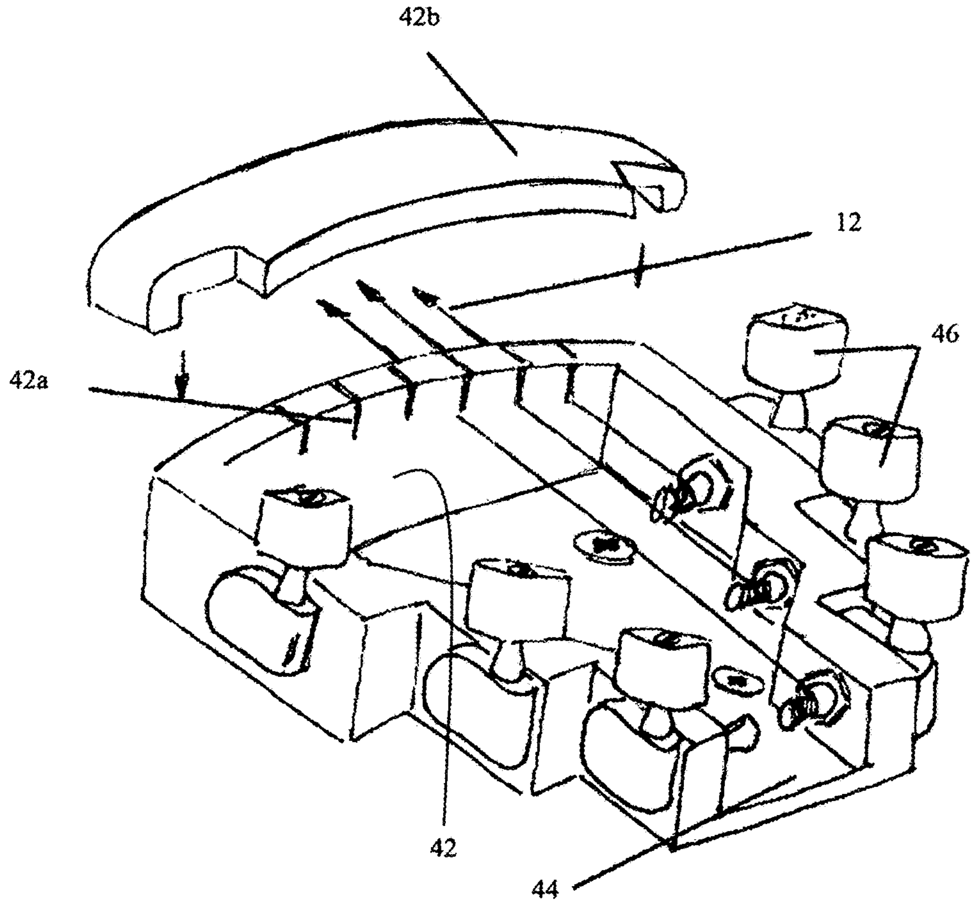

The proximal ends of strings 12 connect to various tuning machines 46 on tail piece 40 (see FIGS. 13A and 13B). Tuning machines 46 work in much the same manner as those on traditional stringed instrument, with the exception of their placement. As discussed above, tailpiece 40 (which includes tuning machines 46) is located on the lower (proximal) end of body 20 and not a headstock on the distal end of neck 60. This arrangement provides numerous advantages in combination with the retractable neck of the instant invention. This placement also, however, provides numerous advantages when used with a traditional stringed instrument as will be appreciated by the skilled artisan.

Tailpiece 40 has proximal 42 and distal ends 44. In the embodiment shown in FIG. 13, the tailpiece has a stepped shape and substantially hollow center. This allows strings 12 to remain as straight as possible in their path between head 80 and the respective tuning machine 46. Similar to nut 86, leading end 42 of tailpiece 40 has numerous slots 42*a* to accommodate strings 12. Cap 48 covers leading end 42 of tailpiece 40 to prevent strings 12 from leaving slots 42*a* if tension on the strings is lost. Leading end 42 serves the same function as a bridge found on standard string instruments. One advantage of placing the bridge structure in the manner shown in FIGS. 13A and 13B is that the bridge has a fixed position and does not need to be displaced during retraction as in some instruments of the prior art. It should be noted that the use of tailpiece 40 can be used in conjunction with a retractable instrument, as described herein, or on a standard instrument of the prior art. Cover 42*b* serves to help retain strings 12 in slots 42*a*.

Figure 14:
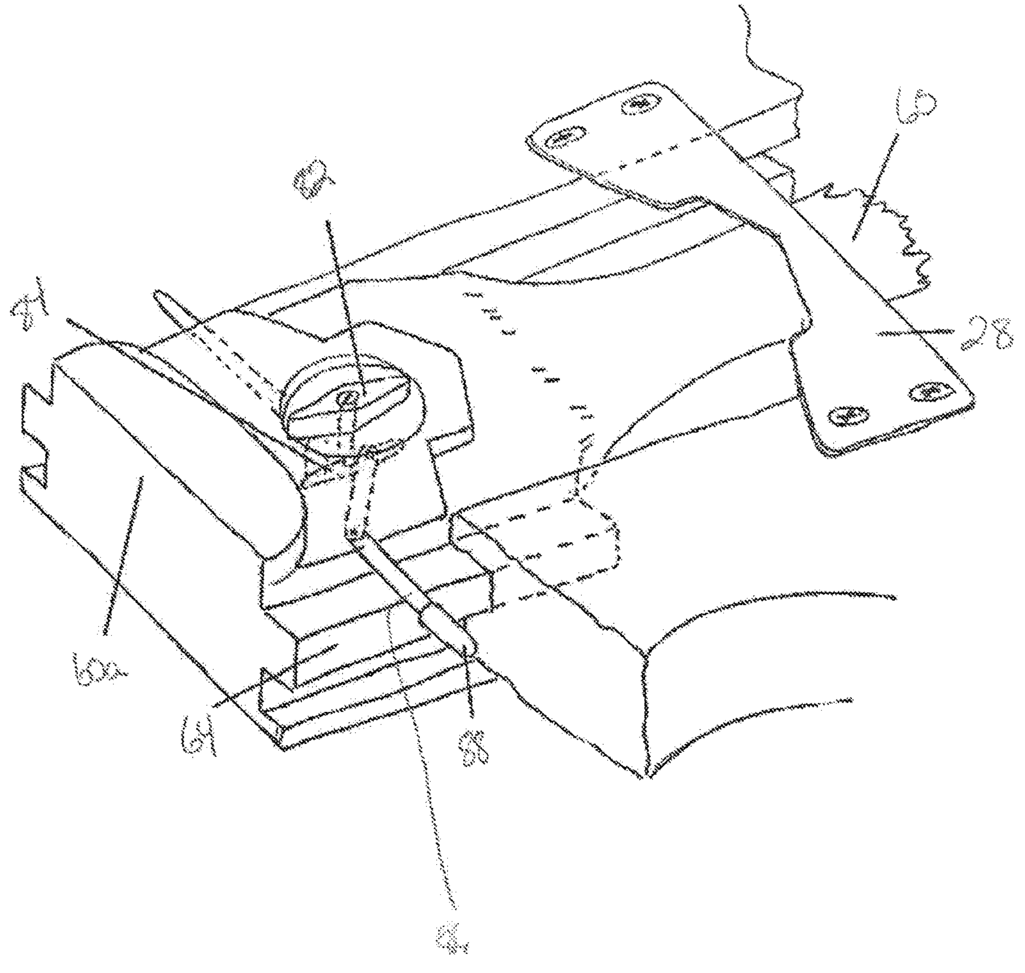
FIG. 14 is a rear view of the proximal portion of the neck illustrating the locking mechanism.

Movement of the neck relative to the body (extension and retraction) is controlled by the locking mechanism shown in FIG. 14. As previously discussed, locking palls 88 extend from rails 64 on the base section 62 of neck 60 to engage apertures 29 in channels 28 on body 20. Extension and retraction (locking and unlocking) of palls 88 are controlled by dial 82 located on the back (underside) of base section 62. Turning dial 82 causes coincident rotation of locking base 84. This movement translates to joined arms 86 which are attached to palls 88.

Also shown in FIG. 14 is bracket 28 which holds wings 24*a* and 24*b* in fixed relative position as well as providing an inward bias to help secure base section 62 within interior space 26. Bracket 28 also serves as a positive stop, preventing over extension of neck 60. Removal of neck 60 from body 20 can be achieved by removing bracket 28 and sliding base section 62 upwardly (distally, in a leading direction) until it is clear of interior space 26.

Additionally, instrument 10 includes stand 90 attached to trailing end 20(*b*) of body 20. Stand 90 not only provides a means to hold instrument 10 in an upright position when not in use, but also provides leverage when extending neck 60. Alternate embodiments of stand 90 are shown in FIGS. 15 and 16.

Figure 15:
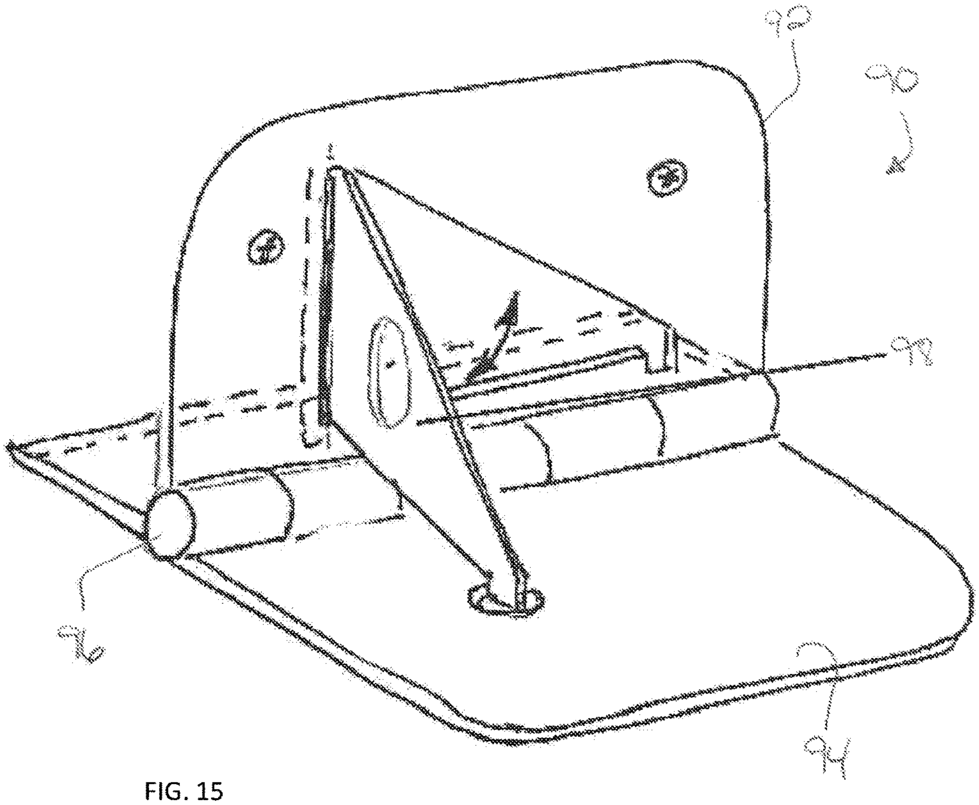
FIG. 15 is an isometric view of a first stand for use with the inventive instrument.

Referring to FIG. 15, stand 90 is attached to the instrument (shot shown) via mechanical fasteners extending through plate 92. Plate 92 is connected to base 94 through hinge 96. Support 98 is hingidly connected to plate 92 and swings outwardly when in use. Support 98 contacts and engages base 94 to provide the structural integrity to support the instrument.

Figure 16:
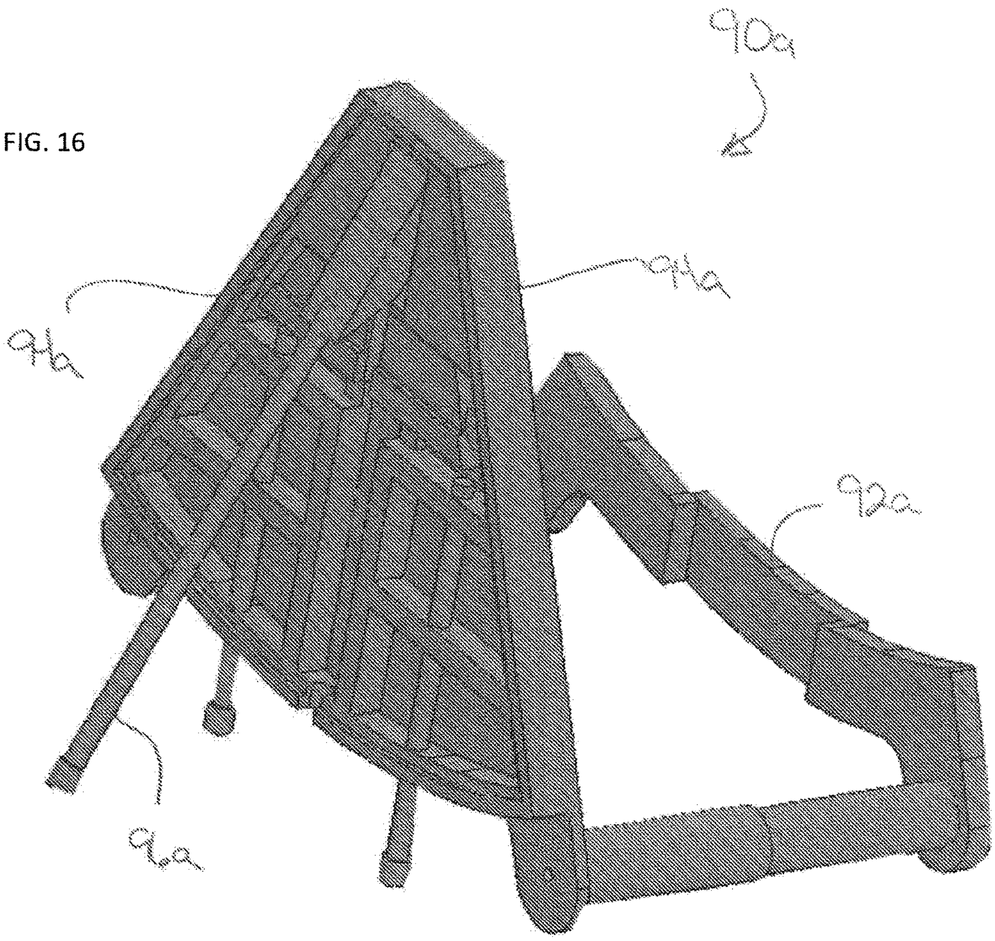
FIG. 16 is an isometric view of a first stand for use with the inventive instrument.

FIG. 16 shows an alternate embodiment of stand 90*a*. The instrument (not shown) is received by the cradle portion 92*a* of the stand. Frame 94*a* extends upwardly and in contact with the back (underside) of body 20. Support arm 96 is pivotally connected to frame 94*a* and swings outwardly to provide the structural integrity to support the instrument.

Figure 17A:
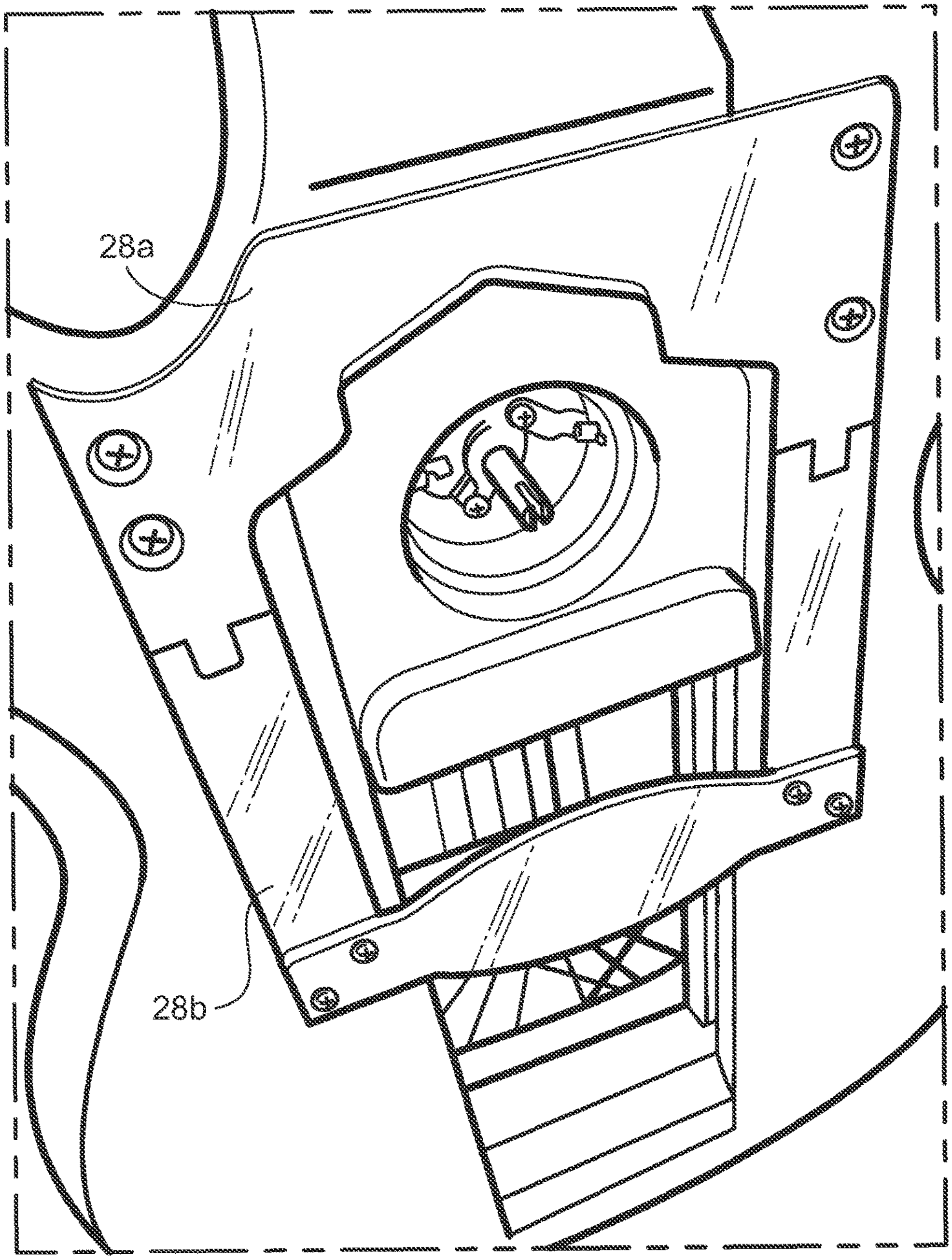
FIGS. 17A through 17C are plan view of an alternate means of applying tension to the device according to an alternate embodiment of the invention.
Figure 17B:
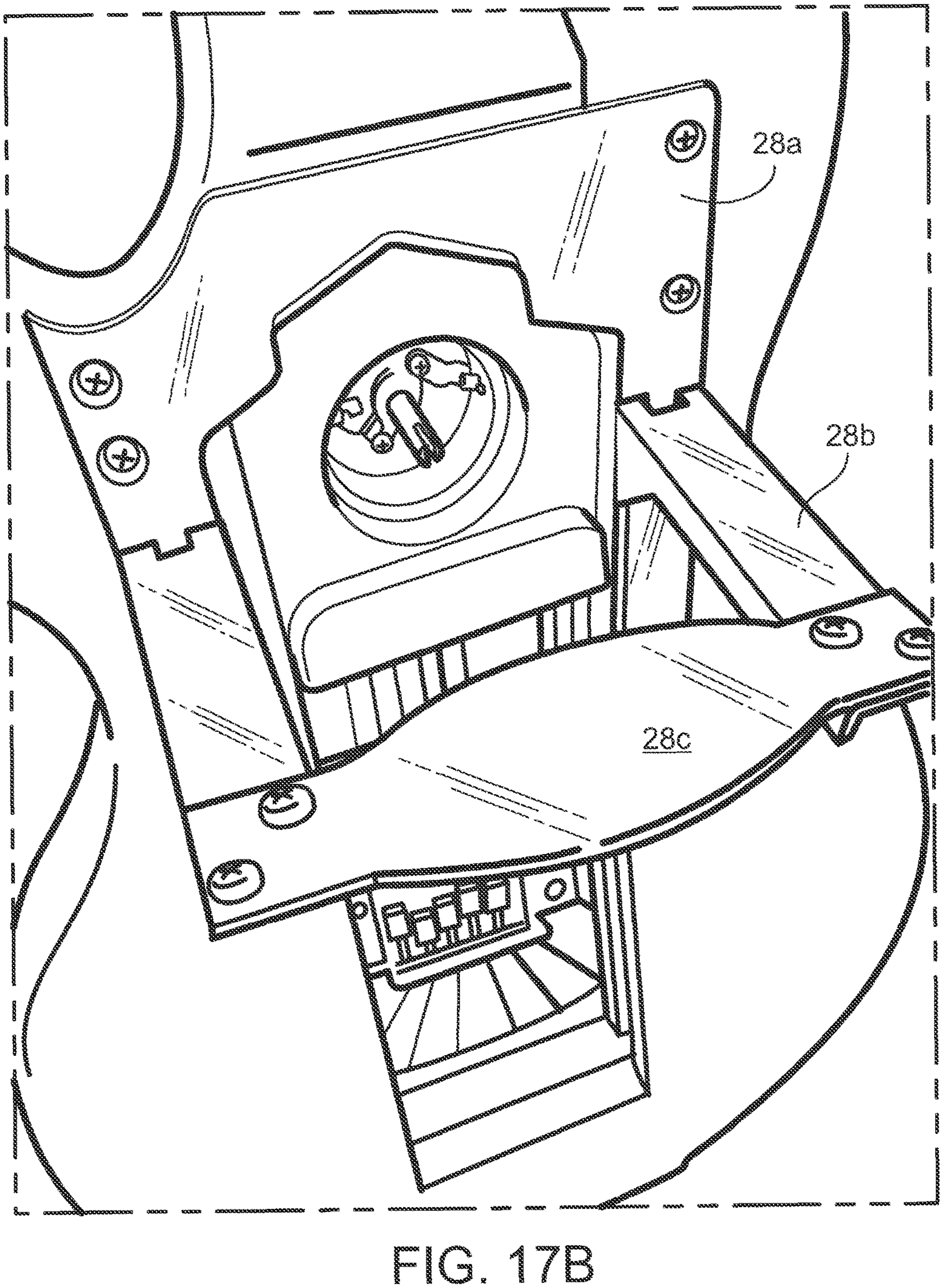
Figure 17C:
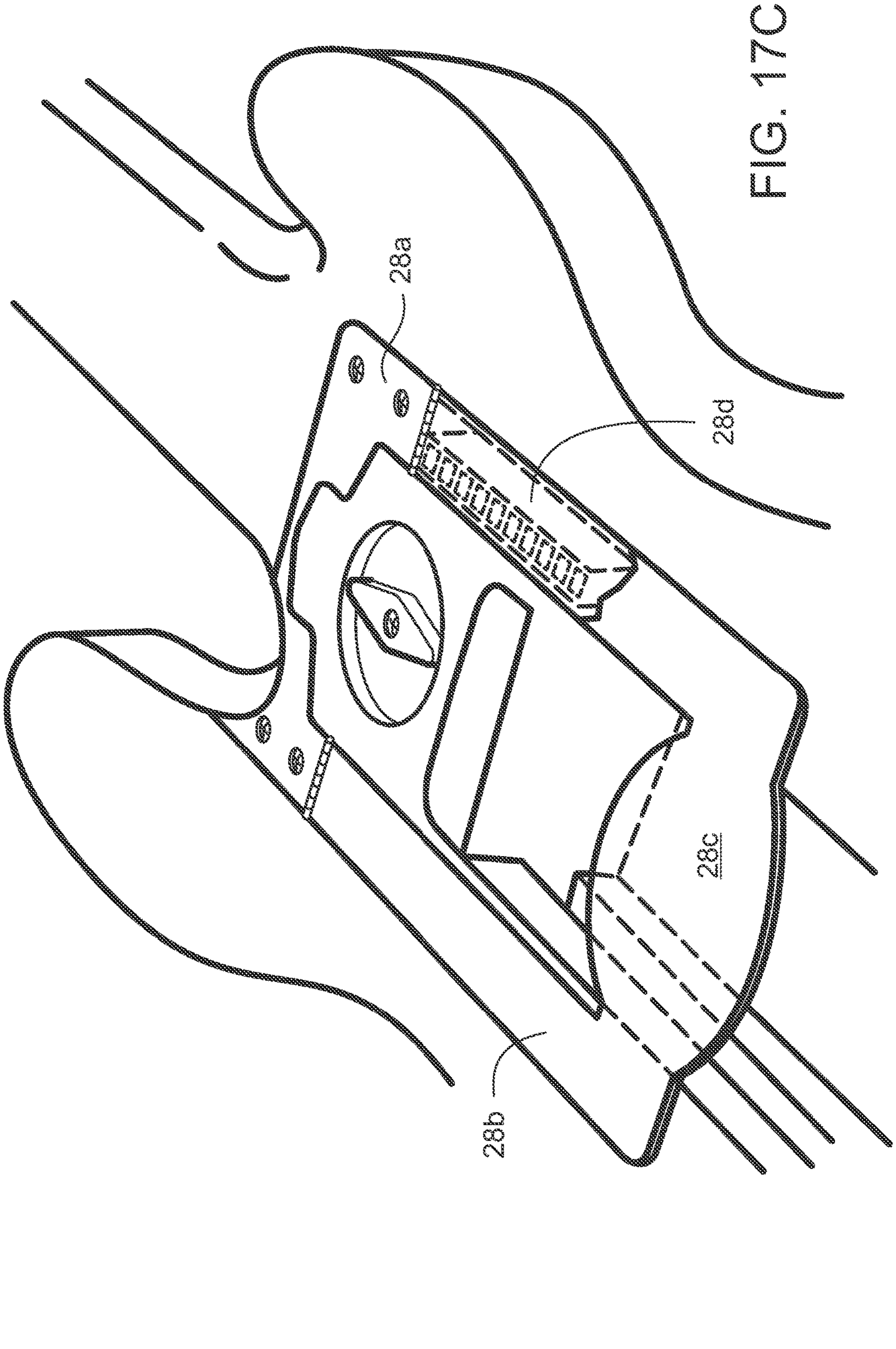

Lastly, with reference to FIGS. 17A, 17B and 17C an alternate embodiment is shown which provides an alternative to stand 90 of FIG. 15 to provide the leverage needed to extend neck 60 when it is under tension. In this embodiment bracket 28 of FIG. 14 is replaced by a similar device comprising upper bracket 28*a* which is hingidly connected to lower bracket 28*b*. Handle area 28*c* provides a gripping surface so that the necessary force can be safely placed on neck 60 during extensions and retraction. Once lower bracket 28*b* is depressed and comes in contact with segmented plates 28*d* the back of the instrument, the mechanism pushes the neck up one step at a time and ultimately into position and not require the manual process of standing on the hinge and extending the neck manually.

Figure 18:
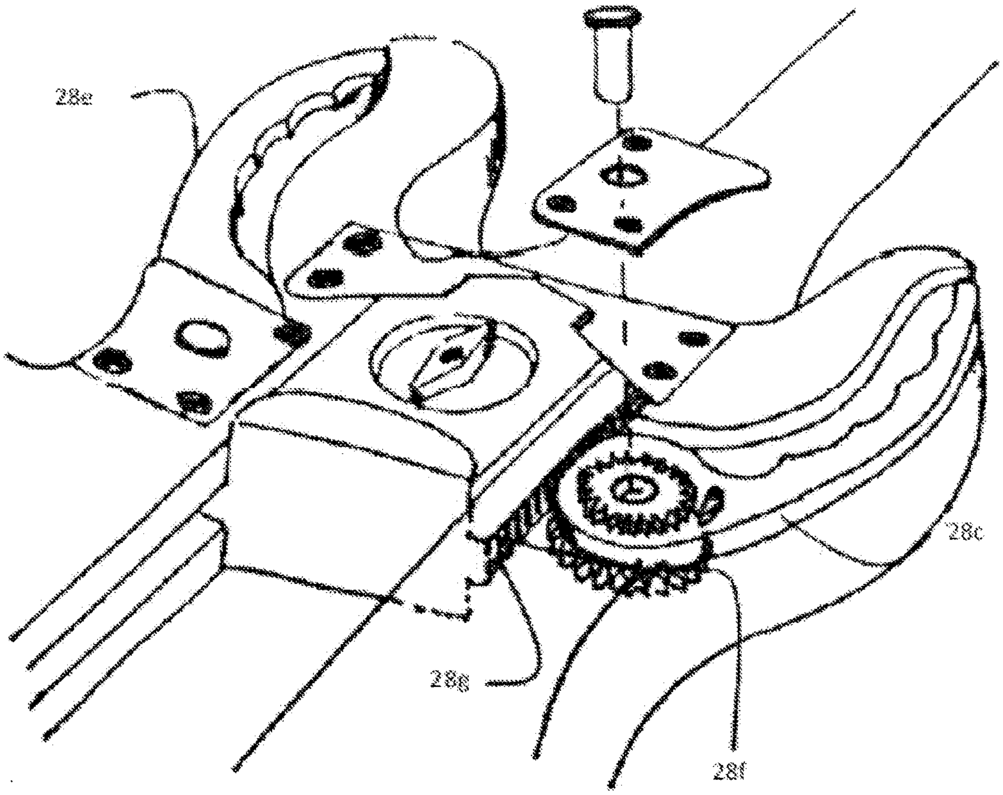
FIG. 18 is a plan view of an alternate means of applying tension to the device according to an alternate embodiment of the invention.

FIG. 18 shows yet another embodiment wherein the neck is advance through use of a ratcheting mechanism. Manipulation of handle 28*e* causes a corresponding toothed cog 28*f* to engage segmented plates 28*g*. The motion of which causes the neck of the instrument to extend or retract (dependent upon which of the paired ratcheting devices is actuated).

Those ordinarily skilled in the art will appreciate that the present invention could be applied to many types of stringed instrument in many different forms. It is also to be understood that the following claims are intended to cover all of the generic and specific features of the invention herein described, and all statements of the scope of the invention which, as a matter of language, might be said to fall there between. Relative terminology, such as "substantially" or "about," describe the specified materials, steps, parameters or ranges as well as those that do not materially affect the basic and novel characteristics of the claimed inventions as whole (as would be appreciated by one of ordinary skill in the art). Now that the invention has been described,

What is claimed is:

1. A musical instrument comprising:

(a) a body having a leading end and a trailing end;

(b) a neck having a distal end and a proximal end, the proximal end of the neck attached to the leading end of the body;

(c) a head portion disposed on the distal end of the neck;

(d) a tailpiece attached to the trailing end of the body, the tailpiece having at least one tuning machine affixed thereto; and (e) a plurality of strings, each having respective first and second ends, wherein a portion of each string adjacent the first end thereof is supported by a respective slot in the head portion and the second end of each string is attached to a respective tuning machine and is supported by a respective slot in the tailpiece, wherein respective heights of the slots in the head portion and tailpiece are chosen to maintain a selected distance between each string and the neck along an entire length of the neck.

2. The instrument of claim 1 further comprising a stand comprising:

(a) a plate affixed to the trailing end of the body;

(b) a frame connected to the plate by a hinge; and (c) a support pivotally connected to the plate along an axis transverse to the hinge.

3. The instrument of claim 1 wherein the respective first end of each string is attached to a trolley mounted for longitudinal motion within the neck.

4. A musical instrument comprising:

(a) a body having a leading end and a trailing end;

(b) a neck having a distal end and a proximal end, the neck mounted for slidable motion longitudinally of the body;

(c) a trolley mounted for longitudinal motion within the neck, the trolley attached to the body by a spring;

d) at least one tuning machine affixed to a tailpiece affixed to the trailing end of the body; and e) a plurality of strings, each having a respective first end attached to the trolley and a respective second end respectively connected to one of the at least one tuning machines.

5. The musical instrument of claim 4 further comprising a head portion disposed on the distal end of the neck, wherein each of the strings is supported by a respective slot in the head portion and a respective slot in the tailpiece.

6. The musical instrument of claim 4 wherein the spring biases the trolley towards the trailing end of the body.

* * * * *